US010834226B2

(12) United States Patent
Folco et al.

(10) Patent No.: US 10,834,226 B2
(45) Date of Patent: Nov. 10, 2020

(54) LIVE MIGRATION OF CONTAINERS BASED ON GEO-LOCATION

(71) Applicant: International Business Machines Corporation, Armonk, NY (US)

(72) Inventors: Rafael C. S. Folco, Santa Bárbara d'Oeste (BR); Breno H. Leitão, Araraquara (BR); Desnes A. Nunes do Rosário, São Paulo (BR); Jose F. Santiago Filho, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 15/211,750

(22) Filed: Jul. 15, 2016

(65) Prior Publication Data

US 2018/0020077 A1 Jan. 18, 2018

(51) Int. Cl.
*H04L 29/08* (2006.01)
*G06F 9/455* (2018.01)
(Continued)

(52) U.S. Cl.
CPC ............ *H04L 67/32* (2013.01); *G06F 3/0647* (2013.01); *G06F 8/656* (2018.02); *G06F 9/45533* (2013.01); *G06F 9/4856* (2013.01); *G06F 9/4862* (2013.01); *G06F 9/50* (2013.01); *G06F 9/5088* (2013.01); *G06F 11/203* (2013.01); *G06F 16/11* (2019.01); *G06F 16/122* (2019.01);
(Continued)

(58) Field of Classification Search
None
See application file for complete search history.

(56) References Cited

U.S. PATENT DOCUMENTS 5,630,129 A * 5/1997 Wheat ................... G06F 9/5083
712/16
6,871,219 B2 * 3/2005 Noordergraaf .......... G06F 12/08
709/214

(Continued)

OTHER PUBLICATIONS

Arzuaga; "Using Live Virtual Machine Migration to Improve Resource Efficiency in Virtualized Data Centers"; Doctoral Dissertation; Northeastern University; Jan. 2012; pp. 1-113; Boston, Massachusetts.

(Continued)

*Primary Examiner* — Patrice L Winder
*Assistant Examiner* — Angela Widhalm de Rodriguez
(74) *Attorney, Agent, or Firm* — Alexa L. Ashworth; Brian M. Restauro (57) ABSTRACT

Embodiments of the present invention provide methods, systems, and computer program products for container communication. In an embodiment, it is determined whether a message is going to a container on a same machine or to a container on a machine at a geographically different location. If it is determined that the message is going to a container on a machine at a geographically different location, then it is determined whether a predetermined threshold has been reached. If it is determined that the predetermined threshold has been reached, then the container from a first machine is migrated to the container on the container on the machine at the geographically different location. A data tracking structure is used to visually represent the migration of containers to other machines.

20 Claims, 8 Drawing Sheets

(51) Int. Cl.

| | | |
|---|---|---|
| *G06F 8/656* | (2018.01) | |
| *G06F 9/50* | (2006.01) | |
| *G06F 9/48* | (2006.01) | |
| *G06F 16/185* | (2019.01) | |
| *G06F 16/11* | (2019.01) | |
| *H04L 29/06* | (2006.01) | |
| *G06F 11/20* | (2006.01) | |
| *G06F 3/06* | (2006.01) | |

(52) U.S. Cl.
CPC ........ *G06F 16/185* (2019.01); *H04L 65/1083* (2013.01); *H04L 67/1008* (2013.01); *H04L 67/148* (2013.01); *G06F 2009/4557* (2013.01)

(56) References Cited

U.S. PATENT DOCUMENTS

| | | |
|---|---|---|
| 8,336,050 B2 | 12/2012 | Dake |
| 8,341,626 B1 | 12/2012 | Gardner et al. |
| 8,386,612 B2 | 2/2013 | Dorai et al. |
| 8,478,878 B2 | 7/2013 | Freimuth et al. |
| 8,694,644 B2 | 4/2014 | Chen et al. |
| 8,972,982 B2* | 3/2015 | McCloy ............... H04L 67/101 718/1 |
| 9,164,808 B2 | 10/2015 | Parker |
| 9,210,040 B2 | 12/2015 | Mikkilineni |
| 9,891,946 B2* | 2/2018 | Bavishi ............... G06F 9/4856 |
| 9,986,031 B2* | 5/2018 | Jain .................... H04L 67/1095 |
| 2010/0217454 A1* | 8/2010 | Spiers ................. G05D 23/1932 700/300 |
| 2011/0134931 A1* | 6/2011 | Merwe ............... H04L 41/0816 370/401 |
| 2011/0225277 A1 | 9/2011 | Reimuth et al. |
| 2012/0005193 A1* | 1/2012 | Nemoto ............... G06F 16/185 707/722 |
| 2012/0096460 A1* | 4/2012 | Sekiguchi ............ G06F 9/45558 718/1 |
| 2012/0137287 A1* | 5/2012 | Pang ................... G06F 9/45558 718/1 |
| 2012/0297016 A1* | 11/2012 | Iyer .................... G06F 9/5072 709/217 |
| 2013/0046874 A1* | 2/2013 | Cohn ................... H04L 41/00 709/223 |
| 2013/0054813 A1* | 2/2013 | Bercovici ............ G06F 9/4856 709/226 |
| 2013/0326038 A1* | 12/2013 | Bodik .................. G06F 9/4856 709/223 |
| 2014/0137125 A1 | 5/2014 | Hsu |
| 2014/0208315 A1 | 7/2014 | Abali et al. |
| 2014/0325515 A1* | 10/2014 | Salmela .............. G06F 9/45533 718/1 |
| 2016/0044143 A1* | 2/2016 | Narasimhamurthy .. H04L 69/16 709/213 |
| 2016/0078085 A1* | 3/2016 | Hu ...................... G06F 16/254 707/765 |
| 2016/0266919 A1* | 9/2016 | Wang .................. G06F 9/4856 |
| 2016/0323245 A1* | 11/2016 | Shieh .................. H04L 63/0263 |
| 2016/0350133 A1* | 12/2016 | Imai ..................... G06F 9/451 |
| 2017/0063674 A1* | 3/2017 | Maskalik ............. H04L 45/38 |
| 2017/0199770 A1* | 7/2017 | Peteva ................ G06F 9/5088 |
| 2017/0212784 A1* | 7/2017 | Johnsen ............... H04L 61/6045 |
| 2017/0220394 A1* | 8/2017 | Shim ................... H04W 4/70 |
| 2018/0013654 A1* | 1/2018 | Kapadia .............. H04L 41/12 |

OTHER PUBLICATIONS

Isci et al.; "Improving server utilization using fast virtual machine migration"; IBM J. Res. & Dev. vol. 55 No. 6 Paper 4; Nov./Dec. 2011; pp. 4:1-4:12.

"CRIU"; Released: Apr. 11, 2016; 5 pages; <http://criu.org/Main_Page>.

Mell et al.; "The NIST Definition of Cloud Computing"; Special Publication 800-145; Sep. 2011; 7 pages.

* cited by examiner

LIVE MIGRATION OF CONTAINERS BASED ON GEO-LOCATION

BACKGROUND OF THE INVENTION

The present invention relates generally to the field of data processing operations, and more particularly to migrating containers in a physically scattered cloud environment based on geo-location.

A container is software that contains everything needed to run a computer program, including a complete file system, code, system tools, and system libraries. Containers are one way to create a virtual environment by using an isolated process on a host computer at the operating system level. Containers use the same operating system as their host systems, and share the host system's kernel with other containers. The kernel is the computer program that is the core of an operating system and has control over everything that occurs in a computer. Each container includes its own processes, memory, devices, network stack, and file system, and runs its own applications.

SUMMARY

According to one embodiment of the present invention, a method for container communication is provided, the method comprising: determining, by one or more processors, whether a message from a first machine is destined for a container on a second machine, wherein the second machine is at a physically different geographical location from the first machine; in response to a determination that the message is destined for the container on the second machine, determining, by the one or more processors, whether a predetermined threshold is reached; and in response to determining that the predetermined threshold is reached, migrating, by the one or more processors, a container of the first machine, to the second machine.

Another embodiment of the present invention provides a computer program product for container communication, based on the method described above.

Another embodiment of the present invention provides a computer system for container communication, based on the method described above.

DETAILED DESCRIPTION

Services are becoming more scattered into containers throughout the cloud, rather than being focused into only one server. Using this architecture, services are independent of one another, i.e., if a service crashes in a container, other services remain operable. Data that comes in at burst rates, for example on the last day of income tax season, may cause services to crash or be unstable due to bandwidth and storage limitations. Embodiments of the present invention provide systems and methods to optimize network and storage throughput by performing data compression and making the determination as to when and where to perform a live migration of containers in a physically scattered cloud environment, based on the geo-location of containers and an analysis of the frequency of data exchange between the containers.

Figure 1:
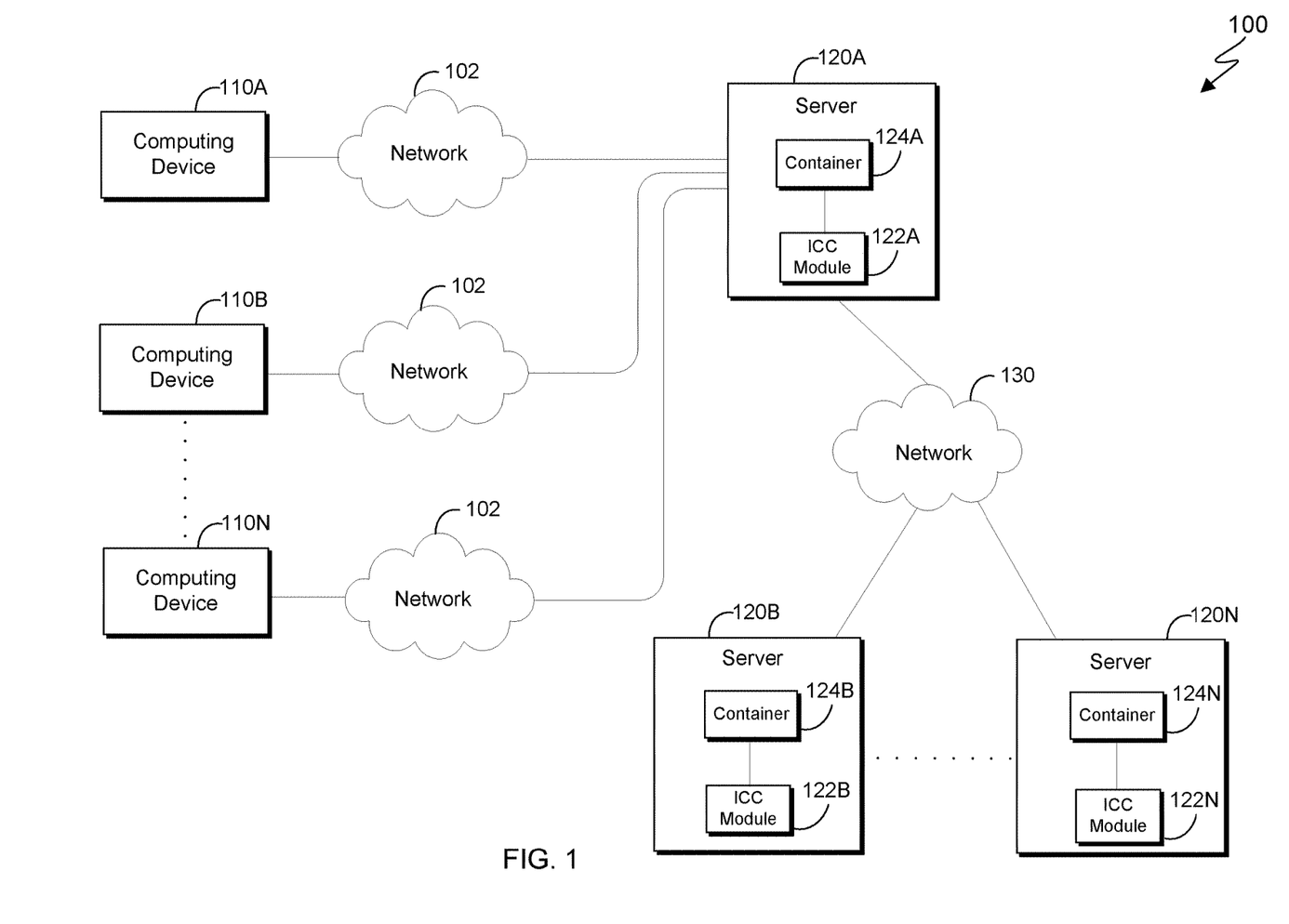
FIG. 1 depicts a distributed cloud computing environment, in accordance with an embodiment of the present invention.

The present invention will now be described in detail with reference to the Figures. FIG. 1 depicts a functional block diagram illustrating a distributed cloud computing environment, generally designated 100, in accordance with an embodiment of the present invention. Modifications to distributed cloud computing environment 100 may be made by those skilled in the art without departing from the scope of the invention as recited by the claims. In an exemplary embodiment, distributed cloud computing environment 100 includes computing devices 110A-N, cloud network 102, and servers 120A-N, interconnected via network 130.

Computing devices 110A-N can be one or more computing devices in distributed cloud computing environment 100. In various embodiments of the present invention, computing devices 110A-N can be a laptop computer, a tablet computer, a netbook computer, a personal computer (PC), a desktop computer, a personal digital assistant (PDA), a smart phone, a thin client, a wearable device, or any programmable electronic device capable of executing computer readable program instructions. Computing devices 110A-N may include internal and external hardware components, as depicted and described in further detail with respect to FIG. 8.

In this exemplary embodiment, cloud network 102 represents a "cloud" of computers interconnected by one or more networks, where cloud network 102 is a computing system utilizing clustered computers and components to act as a single pool of seamless resources when accessed. Cloud network 102 is described in further detail with respect to FIGS. 6 and 7.

In this exemplary embodiment, servers 120A-N represent a server computing system utilizing multiple computers as a server system, such as in a cloud computing environment. Servers 120A-N are geographically scattered servers, such that each of servers 120A-N may be physically located in a different geographic location (e.g., one server may be located in the United States and one server may be located in Brazil). In various embodiments of the present invention, servers 120A-N may be a management server, a computer server, a web server or any other electronic device capable of receiving and sending data. Each of servers 120A-N includes inter container communication (ICC) modules 122A-N and at least one container 124A-N.

Each instance of ICC module 122A-N is a service which stores the metric data of distributed cloud computing environment 100, and constantly refreshes the data in each hypervisor kernel (hypervisor kernel not depicted in FIG. 1). ICC modules 122A-N are scattered in the hypervisor of each of servers 120A-N, respectively, and behave as a kernel module in each hypervisor kernel (i.e., controls memory management, network management, file management, and process management). ICC modules 122A-N determine when and where to migrate containers 124A-N in distributed cloud computing environment 100. ICC modules 122A-N constantly perform a data rate exchange analysis, in order to analyze the frequency of data requests between containers 124A-N, to make informed decisions about whether, and when, to migrate containers 124A-N to a geographically closer location. In this exemplary embodiment, ICC modules 122A-N can be implemented as a standalone system. In other embodiments, ICC modules 122A-N can be implemented with any messaging queue software known in the art.

Containers 124A-N are at least one container associated with each ICC module 122A-N. Containers 124A-N are software that contains everything needed to run a computer program, including a complete file system, code, system tools, and system libraries. Containers 124A-N are a way to virtualize software by using an isolated process on a host computer, and each container 124A-N runs its own processes, memory, devices, network stack, applications, and file system. Additionally, each container 124A-N has its own user space, allowing multiple containers 124A-N to run on a single host. Containers 124A-N cannot access any files outside of their virtualized namespace (e.g., cannot access files on the host system), however, each of containers 124A-N shares the host system kernel with the other containers operating on the host system (i.e., each of containers 124A operating on server 120A shares the host system kernel of server 120A). In this exemplary embodiment, containers 124A-N can be live migrated to reduce data requests and network traffic (i.e., recreate container 124A at the new destination after migration), based on data gathered and analyzed by ICC modules 122A-N.

Network 130 can be, for example, a local area network (LAN), a wide area network (WAN) such as the Internet, or a combination of the two, and can include wired, wireless, or fiber optic connections. In general, network 130 can be any combination of connections and protocols that will support communication and/or access between servers 120A-N. In another embodiment, network 130 may represent a "cloud" of computers interconnected by one or more networks, where network 130 is a computing system utilizing clustered computers and components to act as a single pool of seamless resources when accessed.

Figure 2:
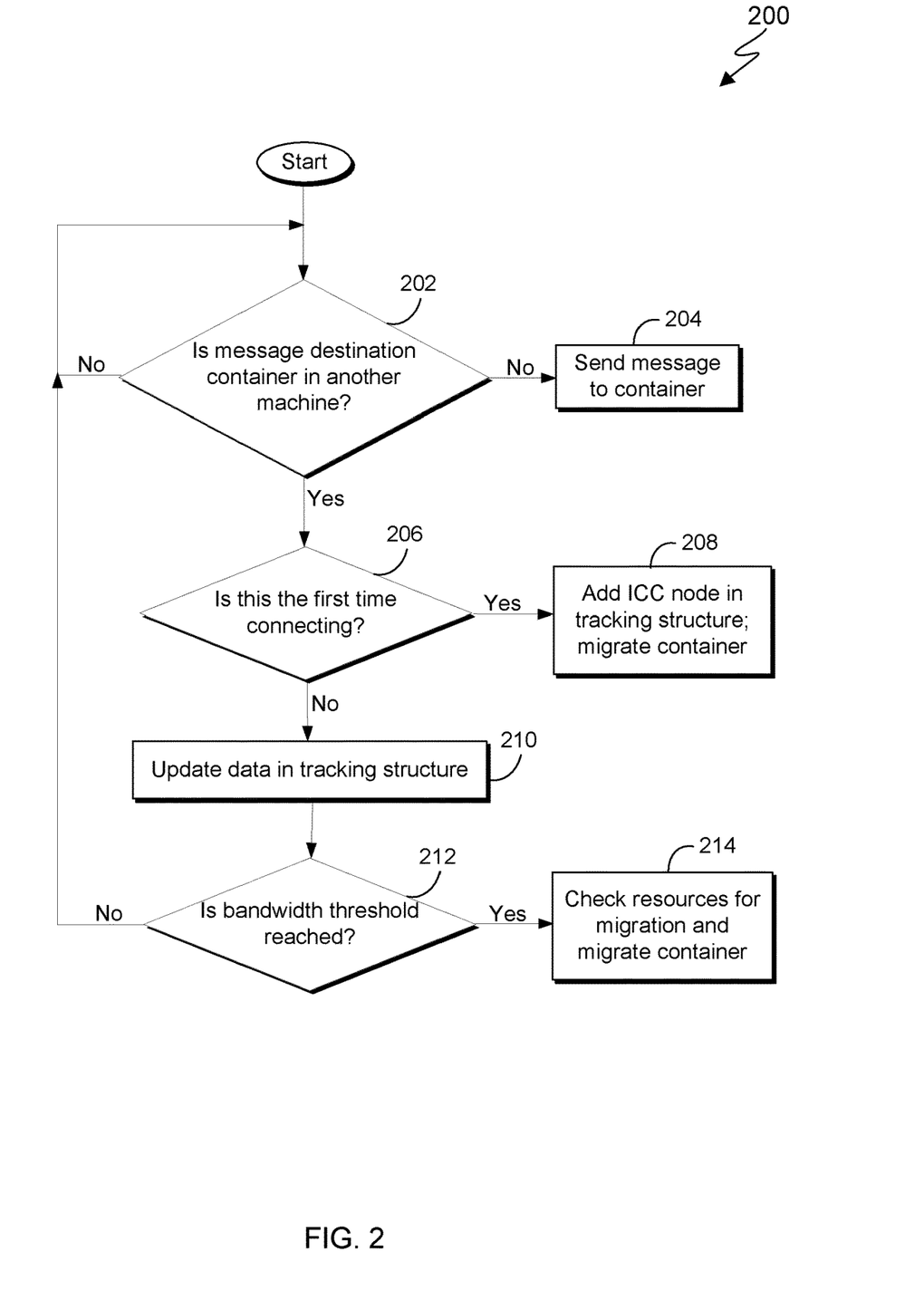
FIG. 2 depicts a flowchart illustrating operational steps for performing container migration, in accordance with an embodiment of the present invention.

FIG. 2 depicts a flowchart 200 illustrating operational steps of ICC modules 122A-N for performing a container live migration, in accordance with an embodiment of the present invention. For illustrative purposes, the following discussion is made with respect to ICC module 122A; it being understood that the operational steps of FIG. 2 may be performed by any of ICC modules 122A-N.

In step 202, ICC module 122A determines whether the message destination container is in another machine. In this exemplary embodiment, ICC module 122A determines whether an outgoing message, such as a data request, is going to a container 124B-N on another machine (e.g., message is being sent from container 124A on server 120A to another server 120B-N).

If, in step 202, ICC module 122A determines that the message destination container is not in another machine, then in step 204, ICC module 122A sends the message to the destination container on the same machine. In this exemplary embodiment, if ICC module 122A determines that the outgoing message destination is not on another machine (i.e., destination container is on the same machine), then ICC module 122A sends the message to the destination container locally on the same machine. For example, ICC module 122A may send the outgoing message to a second container 124A on server 120A.

If, in step 202, ICC module 122A determines that the message destination container is in another machine, then, in step 206, ICC module 122A determines whether it is the first time connecting to the other machine. For example, ICC module 122A may determine that it is the first time connecting to server 120B, the destination of an outgoing message. ICC module 122A keeps track of when each machine (i.e., servers 120A-N) connects and sends messages, in order to update a tracking structure (e.g., the AVL tree of FIG. 5) to visually represent the migration of containers.

If, in step 206, ICC module 122A determines that it is the first time connecting to another machine, then, in step 208, ICC module 122A adds an ICC node in the tracking structure and migrates the container 124A to the destination machine. In this exemplary embodiment, an AVL tree is used for the tracking structure, and a new node is added at the first time of connection between two servers 120A-N. Container 124A is then migrated to the destination machine, and the AVL tree tracks the migration information for each container 124A-N. In this exemplary embodiment, ICC module 122A is a live system, which can update a tracking structure when a container 124A-N comes online, and measure the traffic between communicating containers 124A-N, in order to determine whether a live migration should take place. In this embodiment, during the migration, data and services are compressed such that no information is lost, which helps reduce the traffic from communications in the cloud environment.

If, in step 206, ICC module 122A determines that it is not the first time connecting to another machine (i.e., an outside destination machine), then, in step 210, ICC module 122A updates the tracking structure. In this exemplary embodiment, if the source and destination machines have communicated (i.e., sent and received messages) prior to the present communication, then ICC module 122A updates the information in the tracking structure, to indicate the continual communication between the two containers located on different machines. In this way, ICC module 122A can track the data bandwidth used in the communications between the two containers, and determine when a live migration may occur.

In step 212, ICC module 122A determines whether a threshold is reached. ICC module 122A can set a threshold bandwidth, based on gathered metrics of the system, in order to determine at what point a live migration may benefit the system, by reducing network traffic through data requests. In this exemplary embodiment, the threshold bandwidth is the percentage of bandwidth that each connection between containers 124A-N is consuming. As ICC module 122A constantly analyzes the data exchange between the containers 124A-N of the system, ICC module 122A can determine when the pre-set bandwidth threshold is met.

If, in step 212, ICC module 122A determines that the bandwidth threshold has been reached, then, in step 214, ICC module 122A checks resources for migration and migrates the container 124A. In this exemplary embodiment, once ICC module 122A makes the determination that the pre-set bandwidth threshold has been reached, other factors may be taken into consideration before performing the live migration of container 124A. For example, priority, availability, cost, RAM, storage, CPU usages, and security considerations, among other factors. After ICC module 122A has checked these additional resources and no issues are apparent, then ICC module 122A can perform the live migration of container 124A.

If, in step 212, ICC module 122A determines that the bandwidth threshold is not reached, then ICC module 122A continues to monitor for new outgoing messages (i.e., step 202).

Accordingly, by performing the operational steps of FIG. 2, ICC module 122A can increase the efficiency of geographically scattered cloud environments. By constantly analyzing data received, ICC module 122A can determine where and when to migrate containers 124A-N in order to reduce network traffic and data requests times, while also increasing availability and security. By constantly performing the analysis and migrations where needed, it is feasible that the cloud environment can reach a balanced state, where data and services are at a 'smallest virtual distance' from each other.

Figure 3A:
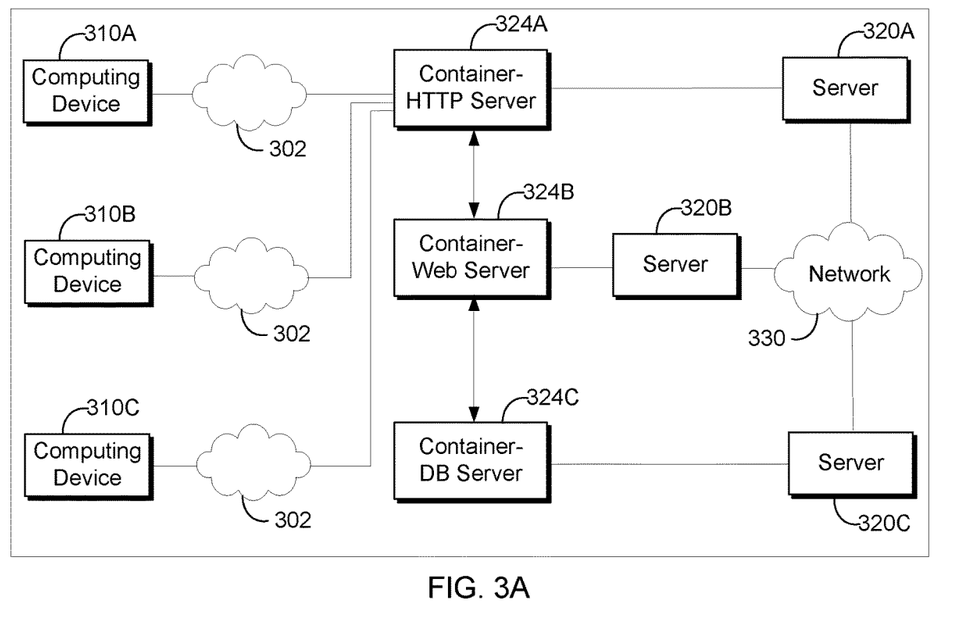
FIGS. 3A and 3B depict an example of a distributed cloud architecture before and after a migration, respectively, in accordance with an embodiment of the present invention.
Figure 3B:
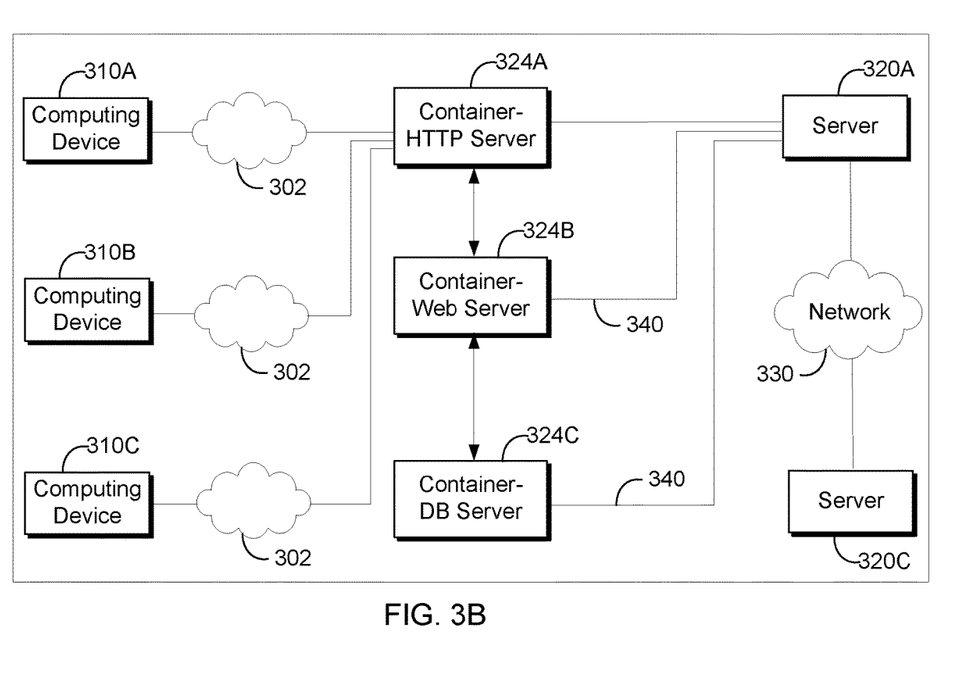

FIGS. 3A and 3B depict an example of a distributed cloud architecture before and after a live migration based on geographically scattered containers, respectively, in accordance with an embodiment of the present invention.

FIG. 3A depicts a distributed cloud computing environment, wherein computing devices 310A-C communicate over a 'cloud' network 302 with servers 320A-C, which are geographically scattered over the world, and intercommunicate via network 330, such as the Internet. Each server 320A-C is associated with a container 324A-C, respectively, which create a virtual software environment. Container 324A provides, for example, a HTTP service for the end-user by running a regular create, retrieve, update, delete (CRUD) application, which continuously exchanges messages with other containers (i.e., container 324B and 324C). Container 324B provides, for example, a web service that container 324A uses to perform user input validation, and container 324C has a database where all data from the application of container 324A is stored. In this example, container 324A is associated with server 320A, which is physically located in the United States, container 324B is associated with server 320B, which is physically located in Germany, and container 324C is associated with server 320C, which is physically located in Brazil. Thus, each of containers 324A-C are geographically scattered around the world. In this example, container 324A has been excessively exchanging messages with container 324B, and ICC module is triggered by perceiving the communication overload, and performs a live migration of container 324B to the infrastructure where container 324A is currently running.

FIG. 3B depicts the distributed cloud computing environment of FIG. 3A, after the live migration of container 324B to the infrastructure where container 324A is currently running, based on geo-location. As depicted, containers 324B and 324C are migrated to the server 320A infrastructure of container 324A, however, the databases of the system are not migrated (i.e., servers 320B and 320C are not migrated, only their containers 324B and 324C, respectively). Communication 340 illustrates the migration of containers 324B and 324C, as each of containers 324B and 324C now communicate on the same server 320A, with container 324A, thus reducing network traffic and response times between the containers, as containers 324A-C are no longer geographically scattered and now run on the same server 320A.

Figure 4A:
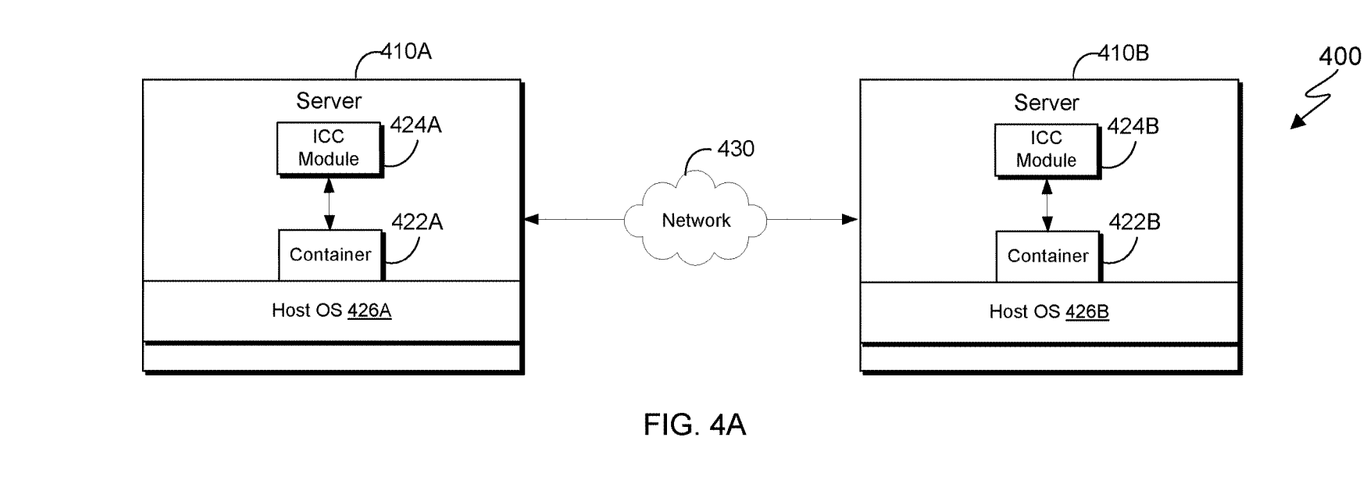
FIGS. 4A and 4B depict an example of before and after a container migration, respectively, in accordance with an embodiment of the present invention.
Figure 4B:
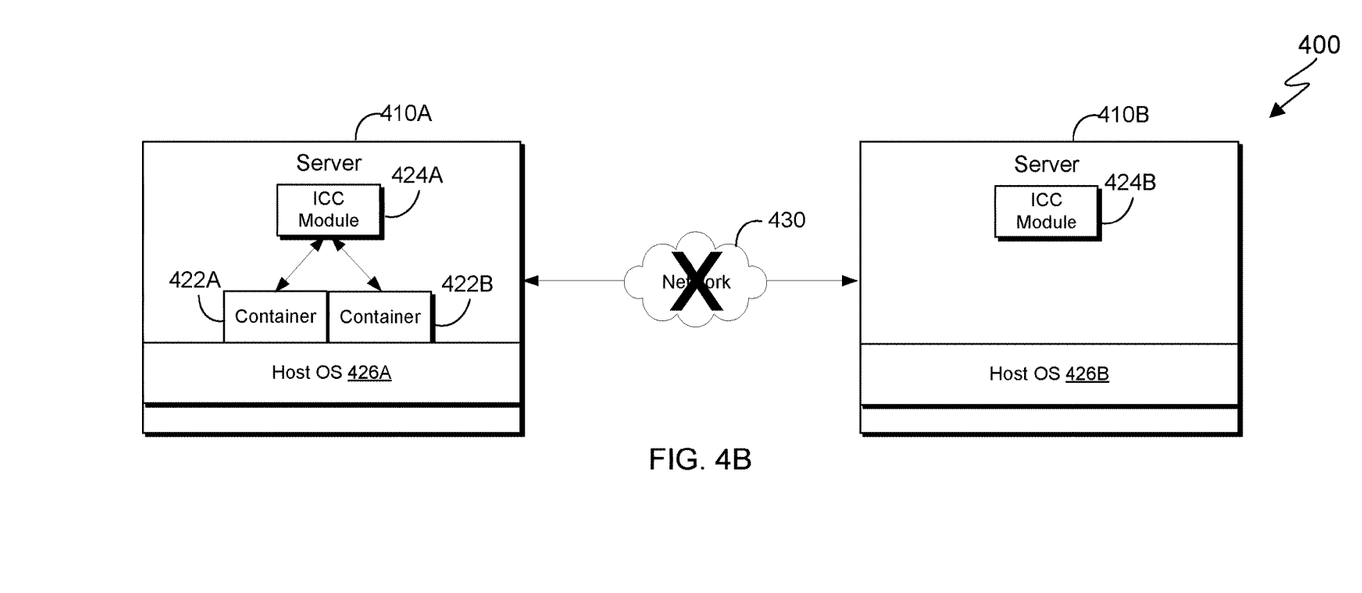

FIGS. 4A and 4B depict an example of before and after a container live migration running on two servers, respectively, in accordance with an embodiment of the present invention.

FIG. 4A illustrates a distributed cloud architecture running on two servers, server 410A and 410B. The ICC module 424A and 424B is responsible for storing and constantly refreshing the tracking structure in each hypervisor (not depicted), which will be used to determine when is the right time to migrate the containers 422A and 422B. As depicted, server 410A includes ICC module 424A, which is in communication with container 422A through an Application Programming Interface (API), operating on a host operating system (OS) 426A. Server 410A communicates through network 430 with server 410B, which includes ICC module 424B, in communication with container 422B through an API, operating on host OS 426B.

FIG. 4B illustrates the distributed cloud architecture of FIG. 4A, after the migration of container 422B to server 410A. As depicted in FIG. 4B, after the migration of container 422B to server 410A, the communication between container 422A and 422B restrictively happens through ICC module 424A, and the network 430 infrastructure is not needed for the communication, further illustrating the reduction in network traffic and data exchange, after the migration of a container.

Figure 5:
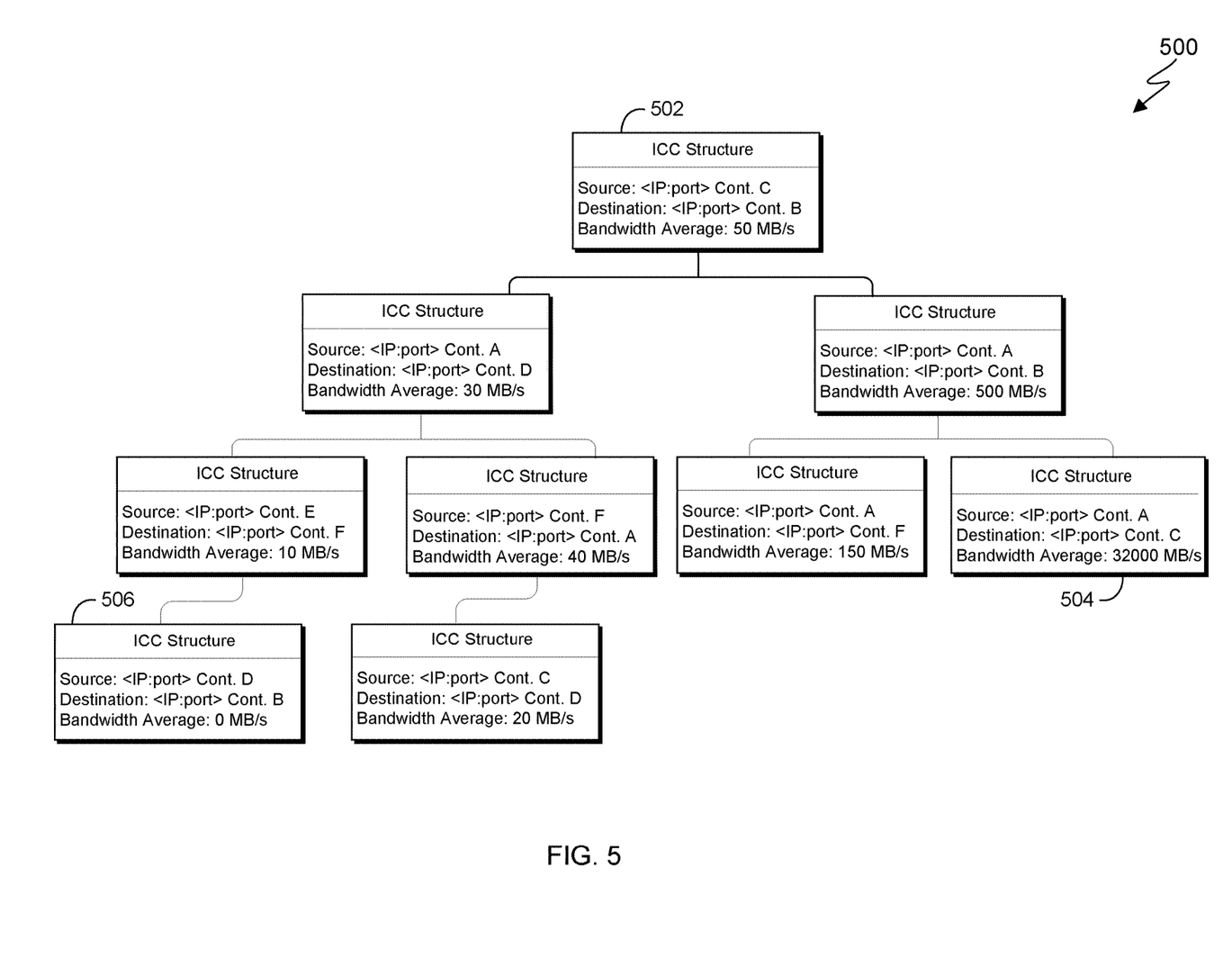
FIG. 5 depicts an example tracking structure to visually represent new nodes when data is transferred between containers in different hosts, in accordance with an embodiment of the present invention.

FIG. 5 depicts an example tracking structure to visually represent new nodes when data is transferred between containers in different hosts, in accordance with an embodiment of the present invention.

In various embodiments of the present invention, any data structure known in the art, which can track and represent the transfer of data between containers can be used. In this exemplary embodiment, an AVL tree 500 is depicted as one example tracking structure to visually represent when data is transferred between containers in different hosts as new nodes. An AVL tree is a binary, height-balancing search tree, in which rebalancing is performed to ensure that the height of each child sub-tree of any node does not differ by more than one. AVL tree 500 receives new nodes whenever data is transferred between containers in different hosts within the same cloud (i.e., step 208 of FIG. 2). The nodes of AVL tree 500 each contain: (i) the source address; (ii) the destination address; and (iii) the average bandwidth currently required by the communication among the containers. For example, node 502 contains the source: "<IP:port>Cont. C", the destination: "<IP:port>Cont. B", and the bandwidth average: "50 MB/s." By pre-setting a bandwidth threshold, the ICC module can correlate the percentage of bandwidth that is consumed by each container connection, on average, and thereafter, take the appropriate action, based on the average bandwidth consumption. The average bandwidth consumption is calculated in order to guarantee that containers do not get migrated due to small peaks in communication (i.e., a 'false positive' in increased bandwidth use among the containers).

For example, in FIG. 5, the bandwidth threshold is set to 80% from the total of 4 GB/s available on the hypervisor. At the next refresh, ICC module may consider performing a live migration of the containers represented by node 504 to another cloud, in order to reduce the resource consumption from the hypervisor, thereby increasing availability, as the communication between the containers represented by node 504 has reached the example pre-set bandwidth threshold (i.e., bandwidth average of node 504 is 3200 MB/s, which is 80% of the 4 GB/s available on the hypervisor). ICC module may also drop node 506 from AVL tree 500, as the bandwidth average has reached 0 MB/s, and thus there are no reported communications between containers D (i.e., source) and B (i.e., destination).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
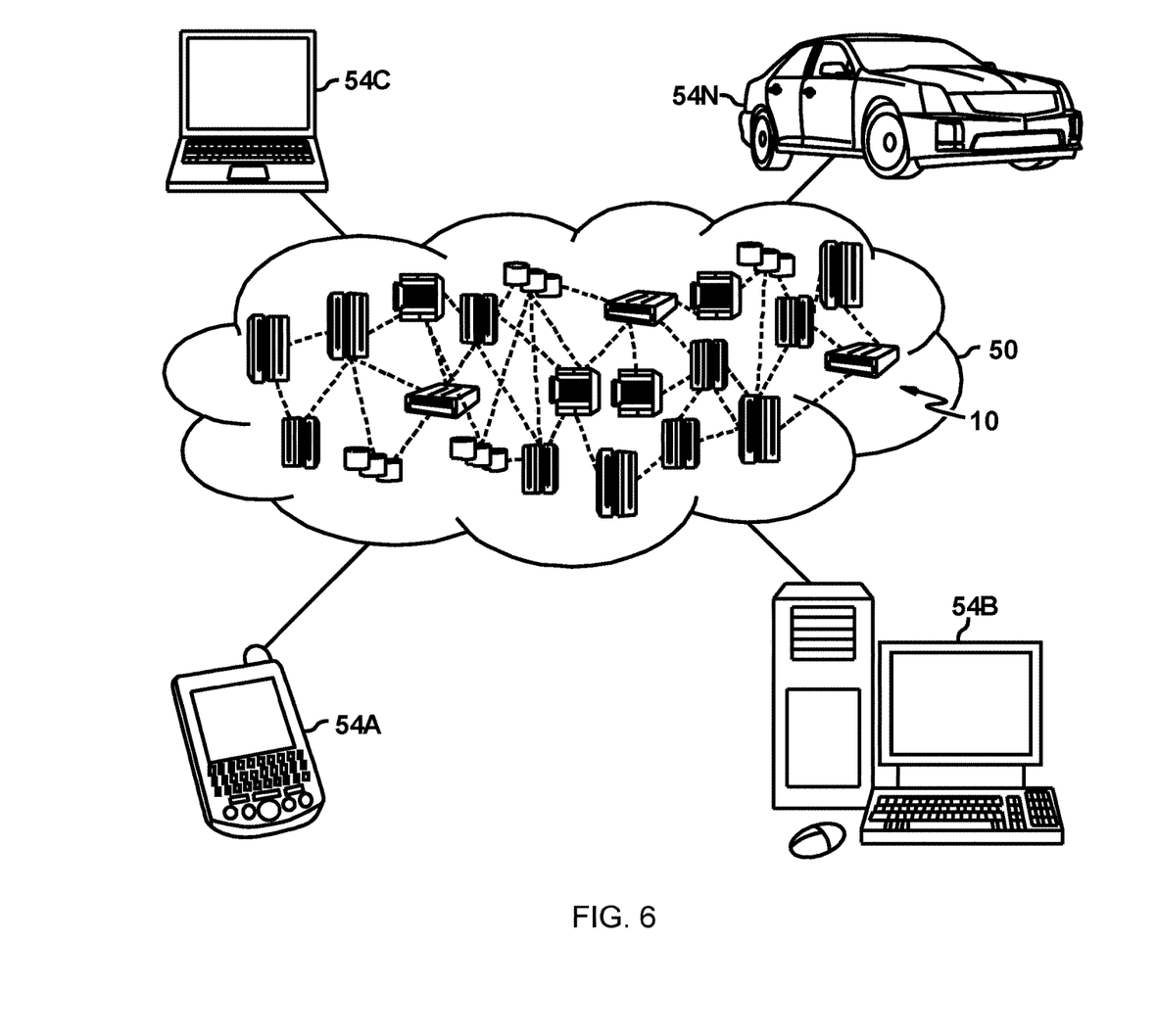
FIG. 6 depicts a cloud computing environment, according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 7:
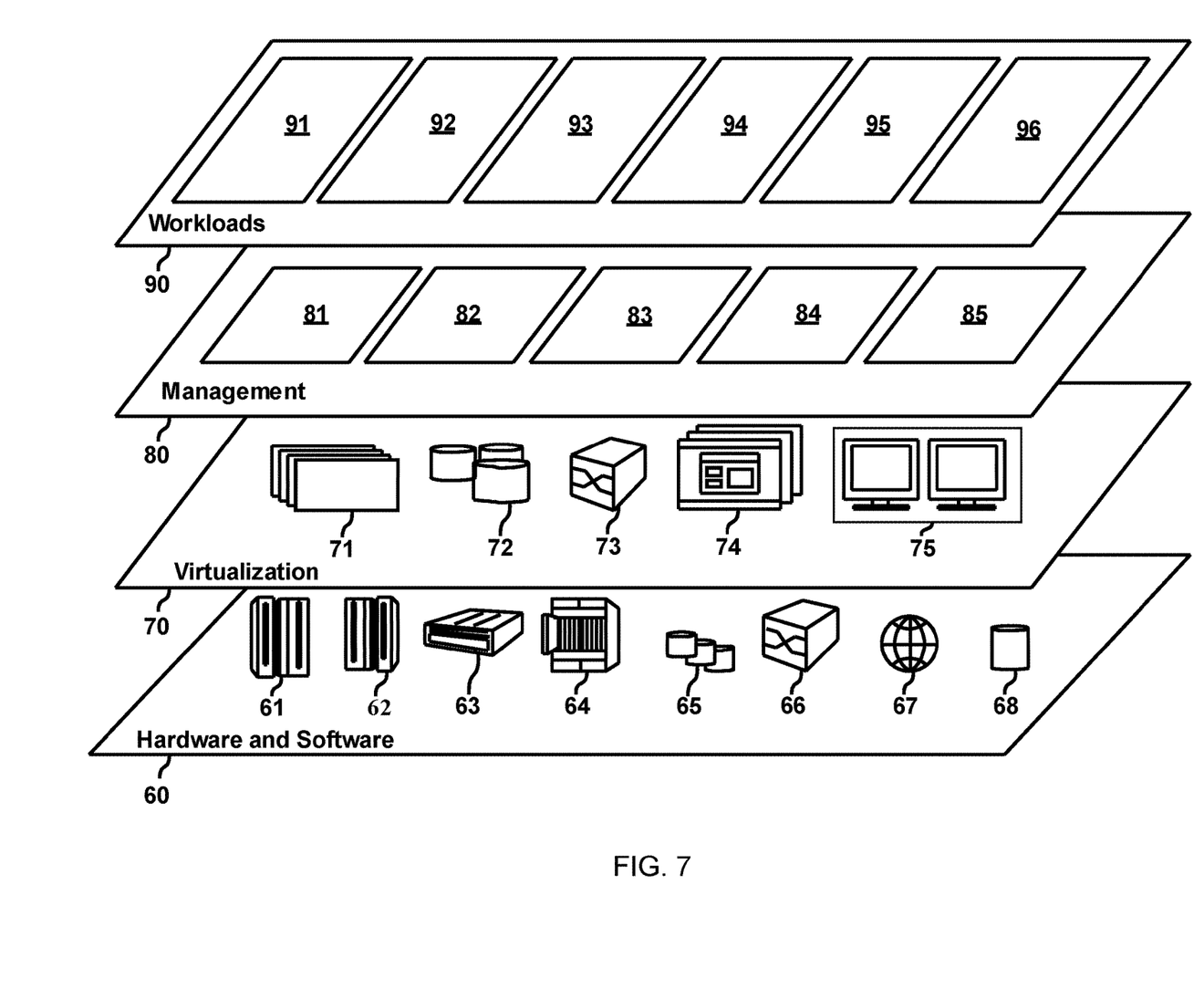
FIG. 7 depicts abstraction model layers, according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container communication 96.

Figure 8:
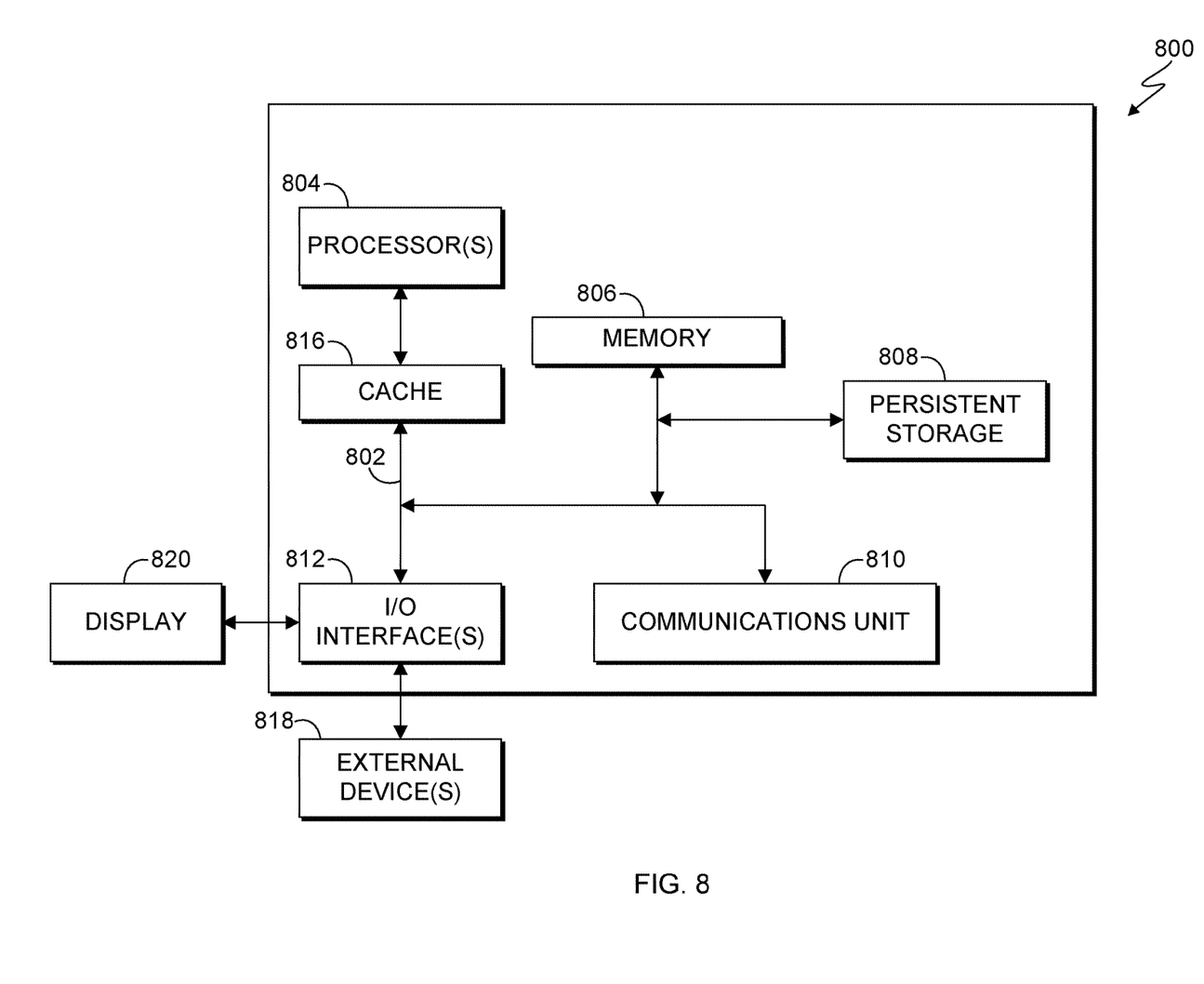
FIG. 8 depicts a block diagram of components of a computing device, in accordance with an illustrative embodiment of the present invention.

FIG. 8 is a block diagram of internal and external components of a computing device, generally designated 800, which is representative of the computing devices of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device 800 includes communications fabric 802, which provides communications between computer processor(s) 804, memory 806, cache 816, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data, and data near recently accessed data, from memory 806.

Program instructions and data used to practice embodiments of the present invention may be stored in persistent storage 808 and in memory 806 for execution by one or more of the respective processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of a network. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to computing device 800. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for container communication, comprising:

in response to determining to send a message, adding, by one or more processors, an inter container communication node to a tracking structure, wherein the tracking structure is an AVL tree, and wherein the inter container communication node stores metric data and refreshes the metric data in each hypervisor kernel of a distributed cloud computing environment;

dynamically determining, by the one or more processors, when and where to perform a live migration of a container originating the message between a plurality of machines based on geographical location of each machine of the plurality of machines and frequency of data exchange between each machine, wherein dynamically determining where to perform a live migration comprises:
identifying that the container originating the message runs on a first machine of the plurality of machines that is in a physically different geographical location from a container running on a second machine of the plurality of machines designated as a recipient of the message, and
optimizing a communications infrastructure between the first machine and the second machine by identifying a single geographic location to migrate either the container originating the message or the container designated as the recipient; and
migrating the container from the first machine to a server identified as the single geographic location that communicates with each of the first and the second machine.

2. The method of claim 1, further comprising:
in response to determining that a predetermined threshold is reached, checking a set of resources for migration, wherein the set of resources comprise: priority considerations; availability; costs; RAM, storage, and CPU usages; and security considerations.

3. The method of claim 2, further comprising:
determining, by the one or more processors, whether this is a first time connecting to the second machine; and
in response to a determination that this is the first time connecting to the second machine, adding an inter-container communicator node to a data tracking structure.

4. The method of claim 3, further comprising:
in response to migrating the container of the first machine, to the second machine, removing, by the one or more processors, a respective inter-container communicator node from the data tracking structure.

5. The method of claim 2, wherein the predetermined threshold comprises a data bandwidth threshold, based on communication between at least two containers.

6. The method of claim 1, wherein the container migrated to the second machine communicates with another container on the second machine through an inter-container communication module, and wherein the inter-container communication module is embedded within a hypervisor kernel.

7. The method of claim 1, further comprises:
determining, by one or more processors, whether a predetermined threshold is reach, wherein determining whether the predetermined threshold is reached, comprises:
analyzing, by the one or more processors, a frequency of data requests between at least two containers; and
determining, by the one or more processors, whether to migrate one of the at least two containers to a geographically closer location, based on the analyzed frequency of data requests between the at least two containers.

8. A computer program product for container communication, comprising:
one or more computer readable storage media and program instructions stored on the one or more computer readable storage media, the program instructions comprising:
program instructions to, in response to determining to send a message, add an inter container communication node to a tracking structure, wherein the tracking structure is an AVL tree, and wherein the inter container communication node stores metric data and refreshes the metric data in each hypervisor kernel of a distributed cloud computing environment;
program instructions to dynamically determine when and where to perform a live migration of a container originating the message between a plurality of machines based on geographical location of each machine of the plurality of machines and frequency of data exchange between each machine, wherein
the program instructions to dynamically determine where to perform a live migration comprises:
program instructions to identify that the container originating the message runs on a first machine of the plurality of machines that is in a physically different geographical location from a container running on a second machine of the plurality of machines designated as a recipient of the message, and
program instructions to optimize a communications infrastructure between the first machine and the second machine by identifying a single geographic location to migrate either the container originating the message or the container designated as the recipient; and
program instructions to migrate the container from the first machine to a server identified as the single geographic location that communicates with each of the first and the second machine.

9. The computer program product of claim 8, further comprising:
program instructions to, in response to determining that a predetermined threshold is reached, check a set of resources for migration, wherein the set of resources comprise: priority considerations; availability; costs; RAM, storage, and CPU usages; and security considerations.

10. The computer program product of claim 9, further comprising:
program instructions to determine whether this is a first time connecting to the second machine; and
program instructions to, in response to a determination that this is the first time connecting to the second machine, add an inter-container communication node to a data tracking structure.

11. The computer program product of claim 10, further comprising:
program instructions to, in response to migrating the container of the first machine, to the second machine, remove a respective inter-container communication node from the data tracking structure.

12. The computer program product of claim 9, wherein the predetermined threshold comprises a bandwidth threshold, based on communication between at least two containers.

13. The computer program product of claim 8, wherein the container migrated to the second machine communicates with another container on the second machine through an inter-container communication module, and wherein the inter-container communication module is embedded within a hypervisor kernel.

14. The computer program product of claim 8, wherein the program instructions stored on the computer readable storage media further comprise:
program instructions to determine whether the predetermined threshold is reached, wherein the program instructions to determine whether the predetermined threshold is reach comprise:
program instructions to analyze a frequency of data requests between at least two containers; and program instructions to determine whether to migrate one of the at least two containers to a geographically closer location, based on the analyzed frequency of data requests between the at least two containers.

15. A computer system for container communication, comprising:
one or more computer processors;
one or more computer readable storage media;
program instructions to, in response to determining to send a message, add an inter container communication node to a tracking structure, wherein the tracking structure is an AVL tree, and wherein the inter container communication node stores metric data and refreshes the metric data in each hypervisor kernel of a distributed cloud computing environment;
program instructions to dynamically determine when and where to perform a live migration of a container originating the message between a plurality of machines based on geographical location of each machine of the plurality of machines and frequency of data exchange between each machine, wherein
the program instructions to dynamically determine where to perform a live migration comprises:
program instructions to identify that the container originating the message runs on a first machine of the plurality of machines that is in a physically different geographical location from a container running on a second machine of the plurality of machines designated as a recipient of the message, and
program instructions to optimize a communications infrastructure between the first machine and the second machine by identifying a single geographic location to migrate either the container originating the message or the container designated as the recipient; and
program instructions to migrate the container from the first machine to a server identified as the single geographic location that communicates with each of the first and the second machine.

16. The computer system of claim 15, further comprising:
program instructions to, in response to determining that a predetermined threshold is reached, check a set of resources for migration, wherein the set of resources comprise: priority considerations; availability; costs; RAM, storage, and CPU usages; and security considerations.

17. The computer system of claim 16, further comprising:
program instructions to determine whether this is a first time connecting to the second machine; and
program instructions to, in response to a determination that this is the first time connecting to the second machine, add an inter-container communication node to a data tracking structure.

18. The computer system of claim 17, further comprising:
program instructions to, in response to migrating the container of the first machine, to the second machine, remove a respective inter-container communication node from the data tracking structure.

19. The computer system of claim 15, wherein the container migrated to the second machine communicates with another container on the second machine through an inter-container communication module, and wherein the inter-container communication module is embedded within a hypervisor kernel.

20. The computer system of claim 15, wherein the program instructions stored on the computer readable storage media further comprise:
program instructions to determine whether the predetermined threshold is reached, wherein the program instructions to determine whether the predetermined threshold is reach comprise:
program instructions to analyze a frequency of data requests between at least two containers; and
program instructions to determine whether to migrate one of the at least two containers to a geographically closer location, based on the analyzed frequency of data requests between the at least two containers.

* * * * *